(12) United States Patent
Kanneh

(10) Patent No.: US 11,630,837 B2
(45) Date of Patent: Apr. 18, 2023

(54) COMPUTER-IMPLEMENTED SYSTEM AND METHOD FOR CREATING FORECAST CHARTS

(71) Applicant: Francis Kanneh, Santa Monica, CA (US)

(72) Inventor: Francis Kanneh, Santa Monica, CA (US)

(73) Assignee: Francis Kanneh, Santa Monica, CA (US)

( * ) Notice: Subject to any disclaimer, the term of this patent is extended or adjusted under 35 U.S.C. 154(b) by 0 days.

(21) Appl. No.: 17/391,043

(22) Filed: Aug. 2, 2021

(65) Prior Publication Data

US 2023/0031414 A1 Feb. 2, 2023

(51) Int. Cl.
*G06F 16/26* (2019.01)
*G06F 16/22* (2019.01)
(Continued)

(52) U.S. Cl.
CPC .............. *G06F 16/26* (2019.01); *G06F 9/547* (2013.01); *G06F 16/2282* (2019.01);
(Continued)

(58) Field of Classification Search
CPC ...... G06F 16/26; G06F 9/547; G06F 16/2282; G06F 16/24534; G06F 16/951; G06N 20/00
(Continued)

(56) References Cited

U.S. PATENT DOCUMENTS 7,987,106 B1 * 7/2011 Aykin ................. G06Q 10/063
  705/7.11
8,429,153 B2 * 4/2013 Birdwell ............. G06F 16/2465
  707/723

(Continued)

*Primary Examiner* — Sheree N Brown

(57) ABSTRACT

A computer-implemented system and method for creating forecast charts. The computer-implemented system includes a computing device, processor, and memory. The processor is configured to connect data sources to a website application. The processors are configured to retrieve, by the website application, unstructured data from the plurality of data sources. The processors are configured to format unstructured data and convert the unstructured data into structured data. The processors are configured to transform, by the website application, the structured data into one or more forecast charts by performing computations by using transformation methods. The structured data is used on dashboard templates, and independent metric templates, wherein at least one of dashboard template is selected from the plurality of dashboard templates presented over a user interface of the computing device by a user. The processors are configured to train Machine Learning (ML) models on the structured data of the dashboard templates. The processors are configured to deploy the ML models on a server. The server is connected to an application programming interface (API). The ML models utilize a recursive multi-step forecasting and adjust a parameter of the recursive multi-step forecasting to fit the structured data. The ML models are used to provide prediction data based on structured data. The processors are configured to create a dashboard based on the dashboard template selected by the user. The API receives and returns the prediction data to the web application where the forecast charts are displayed based on the prediction data.

18 Claims, 11 Drawing Sheets

(51) Int. Cl.
*G06N 20/00* (2019.01)
*G06F 16/951* (2019.01)
*G06F 9/54* (2006.01)
*G06F 16/2453* (2019.01)

(52) U.S. Cl.
CPC ...... *G06F 16/24534* (2019.01); *G06F 16/951* (2019.01); *G06N 20/00* (2019.01)

(58) Field of Classification Search
USPC ........................................................ 707/722
See application file for complete search history.

(56) References Cited

U.S. PATENT DOCUMENTS

| | | | | |
|---|---|---|---|---|
| 8,645,390 B1* | 2/2014 | Oztekin | ............. | G06F 16/9535 707/721 |
| 10,725,638 B1* | 7/2020 | Gardner | ............. | G06F 3/04845 |
| 10,983,759 B1* | 4/2021 | Kumar | ............. | G06F 9/54 |
| 11,017,764 B1* | 5/2021 | Das | ............. | G06F 16/243 |
| 2009/0106656 A1* | 4/2009 | Handy | ............. | G06F 16/906 715/709 |
| 2010/0131496 A1* | 5/2010 | Strehl | ............. | G06Q 30/02 707/E17.014 |
| 2010/0161591 A1* | 6/2010 | Jones | ............. | G06F 16/29 707/E17.014 |
| 2012/0159359 A1* | 6/2012 | Ehrler | ............. | G06F 3/0481 715/763 |
| 2014/0280066 A1* | 9/2014 | Petschulat | ............. | G06F 16/2458 707/722 |
| 2016/0105329 A1* | 4/2016 | Coates | ............. | G06F 16/2455 715/747 |
| 2018/0005538 A1* | 1/2018 | Rockett | ............. | H04L 67/1095 |
| 2018/0024731 A1* | 1/2018 | Sanches | ............. | G06F 3/04817 715/763 |
| 2018/0374011 A1* | 12/2018 | Barr | ............. | G06Q 30/0201 |
| 2019/0102071 A1* | 4/2019 | Redkina | ............. | G06F 16/951 |
| 2020/0349324 A1* | 11/2020 | Ostby | ............. | G06T 15/005 |
| 2021/0271637 A1* | 9/2021 | Kazem | ............. | G06F 40/284 |

* cited by examiner

600

[{"columnHeader" :{'dimesions';[ga:date','ga:channelGrouping',ga:keyword'],'metricHeader':{'metricHeaderEntries':
[{"name: 'ga:avgSessionDuration',"type":"Time"},{"name":ga:bounceRate","type":"PERCENT"},
{"name: 'ga:goalCompletionAll',"type":"INTEGER"},{"name":ga:percentNewSessions","type":"PERCENT"},
{"name: 'ga:pageviewsPerSession',"type":"FLOAT"},{"name":ga:sessions","type":"INTEGER"},
{"name: 'ga:users","type":"INTEGER"}]}},"data":{"rows":[{"dimensions":["20200129","Direct","(not set)"],"metrics":[{"values":
["688.2142857142857","28.57142857142857","0","57.14285714285714","2.7142857142857144","14","8"]}]},{"dimensions":
["20200129","Social","(not set)"],"metrics":[{"values":["0.0","100.0","0","100.0","1.0","4","4"]}]},{"dimensions":
["20200130","Direct","(not set)"],"metrics":[{"values":
["476.7826086956522","56.52173913043478","0","30.434782608695656","2.1739130434782608","23","12"]}]},{"dimensions":
["20200130","Organic Search","(not set)"],"metrics":[{"values":["79.0","0.0","0","100.0","3.0","1","1"]}]},{"dimensions":
["20200130","Organic Search","(amazon)"],"metrics":[{"values":["0.0","100.0","0","100.0","1.0","1","1"]}]},{"dimensions":
["20200131","Direct","(not set)"],"metrics":[{"values":
["412.05555555555554","61.111111111111114","0","20.22222222222222","3.2777777777777777","18","13"]}]},{"dimensions":
["20200131","Organic Search","(not provided)"],"metrics":[{"values":["0.0","100.0","0","100.0","1.0","2","2"]}]},{"dimensions":
["20200131","Referral","(not set)"],"metrics":[{"values":["98.0","0.0","0","100.0","2.0","1","1"]}]},{"dimensions":
["20200201","Direct","(not set)"],"metrics":[{"values":["1502.75","50.0","0","8.333333333333332","10.5","12","7"]}]},{"dimensions":
["20200201","Organic Search","(not provided)"],"metrics":[{"values":
["114.3333333333333","33.33333333333333","0","100.0","2.6666666666666665","3","3"]}]},{"dimensions":["20200201", Referral","(not
["set"],"metrics":[{"values":["0.0", "100.0","0","100.0"1.0","1","1"]}]},{"dimensions":[20200202","Direct","(not set)"],"metrics"
[{"values":["311.9047619047619","66.6666666666666", "0", "57.14285714285714", "2.7142857144", "21", "16"]}]},{"dimensions":
[20200203","Direct", "(not set)","metrics":[{"values":
["702.4117647058823","41.1767058823529", "0", "2352941176470588", "4.588235294117647","17", "10"]}]},{"dimensions":
["2020203","Organic Search", "(not provided)"],"metrics":[{"values":["0.0", "4.588235294117647","17", "10"]}]},{"dimensions":
{"dimensions":["20200205","Organic Search", "(not provided)"],"metrics":[{"values" : ["271.0","0.0","0","100","3.0","1","1"]}]},
{"dimensions":["20200205","Referral","(not set)"], "metrics": [{"values":["0.0", "100.0","0","50.0","1.0","2","1"]}]},{"dimensions"·
["20200205 "Social","(not set)"], "metrics":[{"values" : ["35.25","25.0","0","25.0"," 3.0","4","2"]}]},{"dimensions":
["20200206","Direct","(not set)"],"metrics":[{"values":
["1339.4545454545455","27.27272727272727","0"36.36363636363637","6.909090909090909","11","8"]}]},{"dimensions":
["20200206","Organic Search","(not provided)"],"metrics":[{"values":
["0.0","66.66666666666","0","33.33333333333333","1.3333333333333333","3","3"]}]},{"dimensions":["20200206","Referral", "(not
set)"],"metrics": [{"values":["322.6666666666667","66.6666666666666","0","100.0","1.3333333333333333","3","3"]}]},{"dimensions":
["20200206","Social","(not set)"}, "metrics": [{"values" : ["0.0","100.0","0","0.0","1.0","1","1"]}]},{"dimensions":
["20200207","Direct", "(not set)"],"metrics":[{"values":
["389.8235294117647","58.82352941176471","0","17.647058823529413","3.0","17","8"]}]},{"dimensions":["20260207", "Organic
Search","(not provided)"],"metrics":[{"values":["0.0","100.0","0","50.0","1.0","2","2"]}]},{"dimensions":["20200207", "Organic
Search","(not set)"], "metrics":[{"values":["1842.0","0.0","0","0.0","3.0","1","1"]}]},{"dimensions":["20200267","Referral", "(not
set)"],"metrics":[{"values":["44.75","75.0","0","100.0","1.25","4","4"]}]},{"dimensions":["20200207","Social","(not
set)","metrics":[{"values":["57.5", "50.0","0","50.0","17.0","2","1"]}]},{"dimensions:["20200208", "Direct[","(not set)","metrics":
[{"values":["0.0","100.0","0","0.0","1.0","1",""]}]},{"dimensions":["20200208","Organic Search","(not provided)"],"metrics":
[{"values":["77.0","0.0","0","100.0","6.0","1","1","]}]}).("dimensions":["20200208", "Organic Search","(not set)"],"metrics":
[{"values":["133.5","50.0","0","0.0","1.5","2","1"]}]},{"dimensions":["20200208", "Social."(not set)"],"metrics":[{"values":
["0.0", "100.0", "100.0", "1.0", "1", "1"]}]},{"dimensions":["20200209", "Direct","(not set)"],"metrics":[{"values"

FIG. 6

| dimension_date | dimension_channelGrouping | dimension_keyword | metric_avgSessionDuration | metric_bounceRate | metric_goalCompletionsAll | metric_percentNewSessions | metric_pageviewsPerSession | metric_sessions | metric_users |
|---|---|---|---|---|---|---|---|---|---|
| 2020-01-29 | Direct | (not set) | 688.2142857142857 | 28.57 | 0 | 57.14 | 2.71 | 14 | 8 |
| 2020-01-29 | Social | (not set) | 0.0 | 100.00 | 0 | 100.00 | 1.00 | 4 | 4 |
| 2020-01-30 | Direct | (not set) | 476.7826086956522 | 56.52 | 0 | 30.43 | 2.17 | 23 | 12 |
| 2020-01-30 | Organic Search | (not provided) | 79.0 | 0.00 | 0 | 100.00 | 3.00 | 1 | 1 |
| 2020-01-30 | Organic Search | amazon | 0.0 | 100.00 | 0 | 100.00 | 1.00 | 1 | 1 |
| 2020-01-31 | Direct | (not set) | 412.0555555555554 | 61.11 | 0 | 22.22 | 3.28 | 18 | 13 |
| 2020-01-31 | Organic Search | (not provided) | 0.0 | 100.00 | 0 | 100.00 | 1.00 | 2 | 2 |
| 2020-01-31 | Referral | (not set) | 98.0 | 0.00 | 0 | 100.00 | 2.00 | 1 | 1 |
| 2020-02-01 | Direct | (not set) | 1502.75 | 50.00 | 0 | 8.33 | 10.50 | 12 | 7 |
| 2020-02-01 | Organic Search | (not provided) | 114.3333333333333 | 33.33 | 0 | 100.00 | 2.67 | 3 | 3 |
| 2020-02-01 | Referral | (not set) | 0.0 | 100.00 | 0 | 100.00 | 1.00 | 1 | 1 |
| 2020-02-02 | Direct | (not set) | 311.9047619047619 | 66.67 | 0 | 57.14 | 2.71 | 21 | 16 |
| 2020-02-03 | Direct | (not set) | 702.4117647058823 | 41.18 | 0 | 23.53 | 4.59 | 17 | 10 |
| 2020-02-03 | Organic Search | (not provided) | 0.0 | 100.00 | 0 | 100.00 | 1.00 | 2 | 2 |
| 2020-02-03 | Referral | (not set) | 0.0 | 100.00 | 0 | 100.00 | 1.00 | 1 | 1 |
| 2020-02-04 | Direct | (not set) | 852.7142857142857 | 57.14 | 0 | 42.86 | 5.43 | 7 | 6 |
| 2020-02-04 | Organic Search | (not provided) | 1.4 | 80.00 | 0 | 60.00 | 1.20 | 5 | 4 |
| 2020-02-05 | Direct | (not set) | 1448.5 | 16.67 | 0 | 16.67 | 10.50 | 6 | 4 |
| 2020-02-05 | Organic Search | (not provided) | 217.0 | 0.00 | 0 | 100.00 | 3.00 | 1 | 1 |
| 2020-02-05 | Referral | (not set) | 0.0 | 100.00 | 0 | 50.00 | 1.00 | 2 | 1 |
| 2020-02-05 | Social | (not set) | 35.25 | 25.00 | 0 | 25.00 | 3.00 | 4 | 2 |
| 2020-02-06 | Direct | (not set) | 1339.454545454545 | 27.27 | 0 | 36.36 | 6.91 | 11 | 8 |
| 2020-02-06 | Organic Search | (not provided) | 0.0 | 66.67 | 0 | 33.33 | 1.33 | 3 | 3 |
| 2020-02-06 | Referral | (not set) | 322.6666666666667 | 66.67 | 0 | 100.00 | 1.33 | 3 | 3 |
| 2020-02-06 | Social | (not set) | 0.0 | 100.00 | 0 | 0.00 | 1.00 | 1 | 1 |

FIG. 7

COMPUTER-IMPLEMENTED SYSTEM AND METHOD FOR CREATING FORECAST CHARTS

FIELD OF INVENTION

The present invention is generally related to a computer-implemented system and for creating one or more forecast charts.

BACKGROUND OF INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

Currently, there is a growing use of machine learning (ML) algorithms on datasets to extract and analyze information. US patent publication US20180165604A1 filed by Minkin; Andrew M.; et al. discloses a system for automating data science machine learning using analytical workflows are disclosed that provide for user interaction and iterative analysis including automated suggestions based on at least one analysis of a dataset.

Further, US patent publication US20210042658A1 filed by Sainani; Manish; et al. talks about facilitating concurrent forecasting associating with multiple time series data sets. In accordance with aspects of the present disclosure, a request to perform predictive analysis in association with multiple time series data sets is received. Thereafter, the request is parsed to identify each of the time series data sets to use in predictive analysis. For each time-series data set, an object is initiated to perform the predictive analysis for the corresponding time series data set. Generally, the predictive analysis predicts expected outcomes based on the corresponding time series data set. Each object is concurrently executed to generate expected outcomes associated with the corresponding time series data set, and the expected outcomes associated with each of the corresponding time series data sets are provided for display.

As datasets grow in size for applications such as topic modeling, recommender systems, and internet search queries, there is a need for a system and method for automatically creating forecast charts by using ML algorithms on large datasets. Present implementations of ML algorithms require manual adjustment by the users.

Thus, in view of the above, there is a long-felt need in the industry to address the aforementioned deficiencies and inadequacies.

Further limitations and disadvantages of conventional approaches will become apparent to one of skill in the art through comparison of described systems with some aspects of the present disclosure, as set forth in the remainder of the present application and with reference to the drawings.

SUMMARY OF THE INVENTION

A computer-implemented system and method for creating one or more forecast charts are provided substantially, as shown in and/or described in connection with at least one of the figures.

An aspect of the present disclosure relates to a computer-implemented system for creating one or more forecast charts. The computer-implemented system includes a computing device, one or more processors; and a memory. The memory is coupled to the one or more processors and to store instructions executable by the one or more processors. The processors are configured to connect a plurality of data sources to a website application. The website application authenticates the plurality of data sources. The processors are configured to retrieve, by the website application, unstructured data from the plurality of data sources. The processors are configured to format unstructured data and convert the unstructured data into structured data by using an open standard file format and data interchange format. The website application stores the structured data in a table of a database. The processors are configured to transform, by the website application, the structured data into one or more forecast charts by performing a plurality of computations by using a plurality of transformation methods. The structured data is used on one or more of a plurality of dashboard templates, and a plurality of independent metric templates, wherein at least one of a dashboard template is selected from the plurality of dashboard templates presented over a user interface of the computing device by a user. The user authenticates the dashboard template to connect with the data sources. The processors are configured to train a plurality of Machine Learning (ML) models on the structured data of the dashboard templates. The processors are configured to deploy the Machine Learning (ML) models on a server. The server is connected to an application programming interface(API). The ML models utilize recursive multi-step forecasting and adjust a parameter of the recursive multi-step forecasting to fit the structured data. The Machine Learning (ML) models are used to provide prediction data based on the structured data. The processors are configured to create a dashboard based on the dashboard template selected by the user. The dashboard includes one or more forecast charts. The API receives and returns the prediction data to the web application where one or more forecast charts are displayed based on the prediction data.

In an aspect, the processors are configured to facilitate the user to create the dashboard with a plurality of metrics. In an aspect, the user selects one or more metric templates from the list. The user authenticates to connect with the required data source (if not authenticated already). Further, the user selects the desired dashboard or creates a new dashboard, or adds independently. The metrics are created under the user's account.

In an aspect, the processors are configured to facilitate a user to open the dashboard in the web application or a shared dashboard. Then, the web application calls the application programming interface (API) which internally calls the respective ML models.

In an aspect, the open standard file format and data interchange format is a JavaScript Object Notation (JSON) format.

In an aspect, the table is a MySQL table. The table organizes the valid formatted data in a form of rows and columns and displays the valid formatted data in a structured format.

In an aspect, the transformation methods include a manual transformation and an automatic transformation.

In an aspect, the manual transformation is performed by a user by applying one or more filters and a plurality of arithmetic operations.

In an aspect, the automatic transformation is performed for the dashboard and the independent metric template.

In an aspect, the application programming interface (API) is a REST API (RESTful API).

An aspect of the present disclosure relates to a computer-implemented method for creating one or more forecast charts. The method includes a step of connecting a plurality of data sources to a website application. The website application authenticates the plurality of data sources. The method includes a step of retrieving, by the website application, unstructured data from the plurality of data sources. The method includes a step of formatting unstructured data and converting the unstructured data into structured data by using an open standard file format and data interchange format. The website application stores the structured data in a table of a database. The method includes a step of transforming, by the website application, the structured data into one or more forecast charts by performing a plurality of computations by using a plurality of transformation methods. The structured data is used on one or more of a plurality of dashboard templates, and a plurality of independent metric templates. In an aspect, a dashboard template is selected from the plurality of dashboard templates presented over a user interface of the computing device by a user. The user authenticates the dashboard template to connect with the data sources. The method includes a step of training a plurality of Machine Learning (ML) models on the structured data of the dashboard templates. The method includes a step of deploying the Machine Learning (ML)models on a server, wherein the server is connected to an application programming interface (API), wherein the ML models utilize recursive multi-step forecasting and adjust a parameter of the recursive multi-step forecasting to fit the structured data. The Machine Learning (ML) models are used to provide prediction data based on the structured data. The method includes a step of creating a dashboard based on the dashboard template selected by the user. The dashboard includes the one or more forecast charts. The API receives and returns the prediction data to the web application where the one or more forecast charts are displayed based on the prediction data.

In an aspect, the processors are configured to facilitate the user to create the dashboard with a plurality of metrics. In an aspect, the user selects one or more metric templates from the list. The user authenticates to connect with the required data source (if not authenticated already). Further, the user selects the desired dashboard or creates a new dashboard, or adds independently. The metrics are created under the user's account.

In an aspect, the processors are configured to facilitate a user to open the dashboard in the web application or a shared dashboard. Then, the web application calls the application programming interface (API) which internally calls the respective ML models.

In an aspect, the open standard file format and data interchange format is a JavaScript Object Notation (JSON) format.

In an aspect, the table is a MySQL table. The table organizes the valid formatted data in a form of rows and columns and displays the valid formatted data in a structured format.

In an aspect, the transformation methods include a manual transformation and an automatic transformation.

In an aspect, the manual transformation is performed by a user by applying one or more filters and a plurality of arithmetic operations.

In an aspect, the automatic transformation is performed for the dashboard and the independent metric template.

In an aspect, the application programming interface (API) is a REST API (RESTful API).

Accordingly, one advantage of the present invention is that it provides a web application that allows the user to form the forecasting chart which can be added to their desired dashboard. The dataset is provided by the user to the web application and the web application sorts the data. The user creates their dashboard using metrics or can have ready-made dashboards. The ML models use the dataset of dashboard templates to form the forecasting charts.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIG. t illustrates a network implementation of the present computer-implemented system for creating one or more forecast charts, in accordance with an embodiment of the present subject matter.

Figure 2:
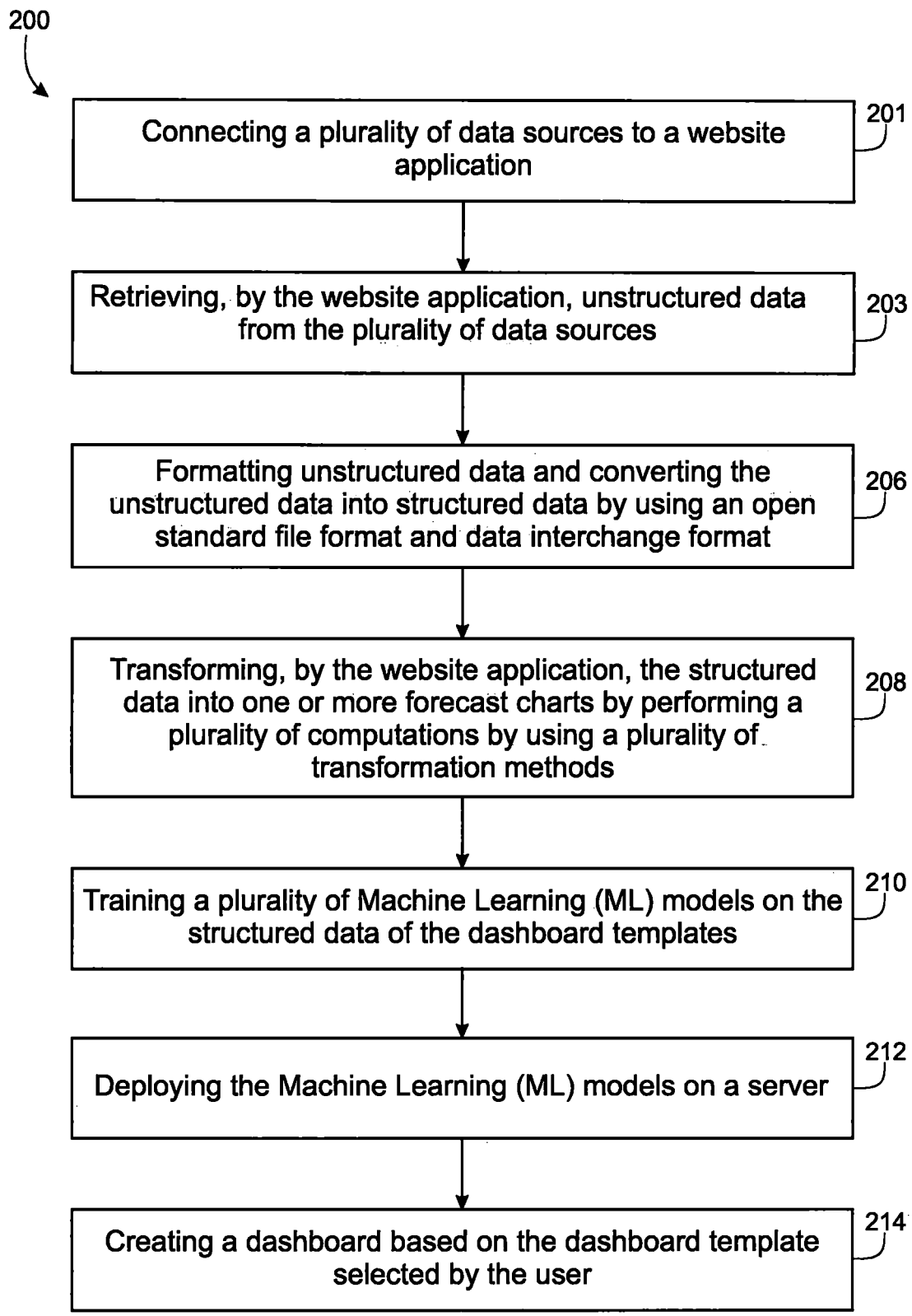

FIG. 2 illustrates a flowchart of the present computer-implemented method for creating one or more forecast charts, in accordance with an embodiment of the present subject matter.

Figure 3:
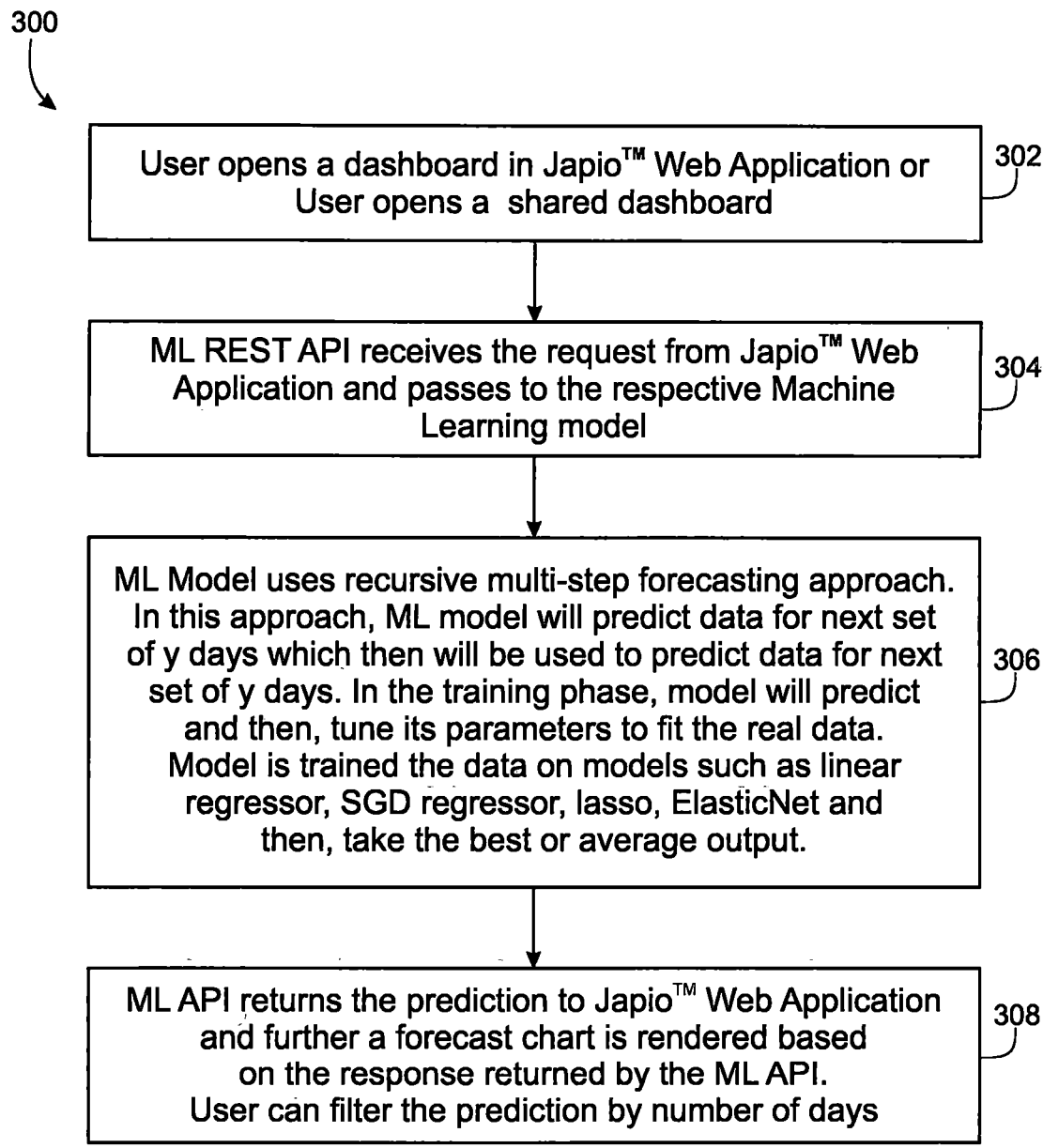

FIG. 3 illustrates an operational flowchart of the present computer-implemented method for creating one or more forecast charts by using ML models, in accordance with an embodiment of the present subject matter.

Figure 4:
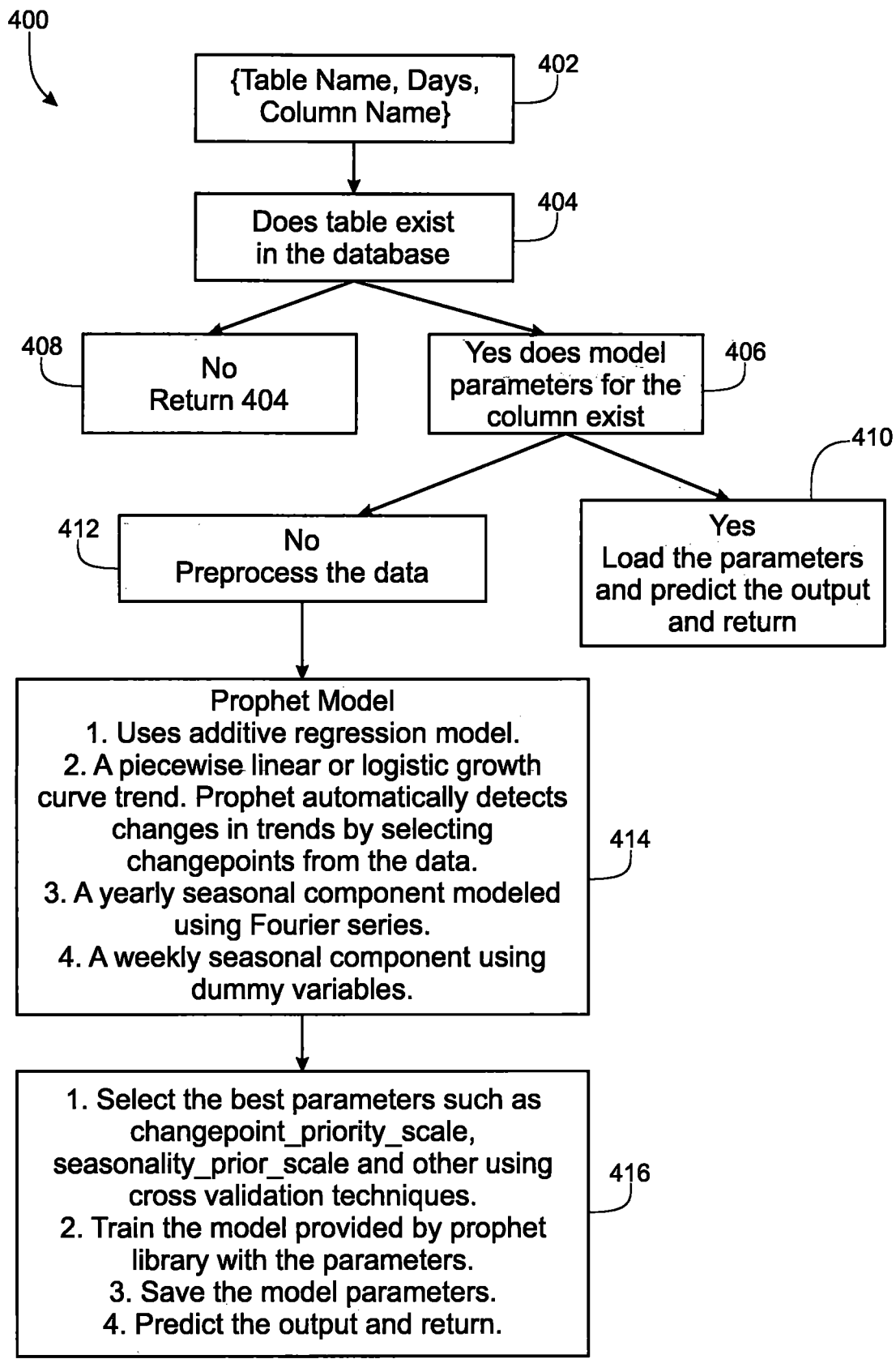

FIG. 4 illustrates a flowchart of the Machine Learning (ML) models to provide prediction data based on the structured data, in accordance with an embodiment of the present subject matter.

Figure 5:
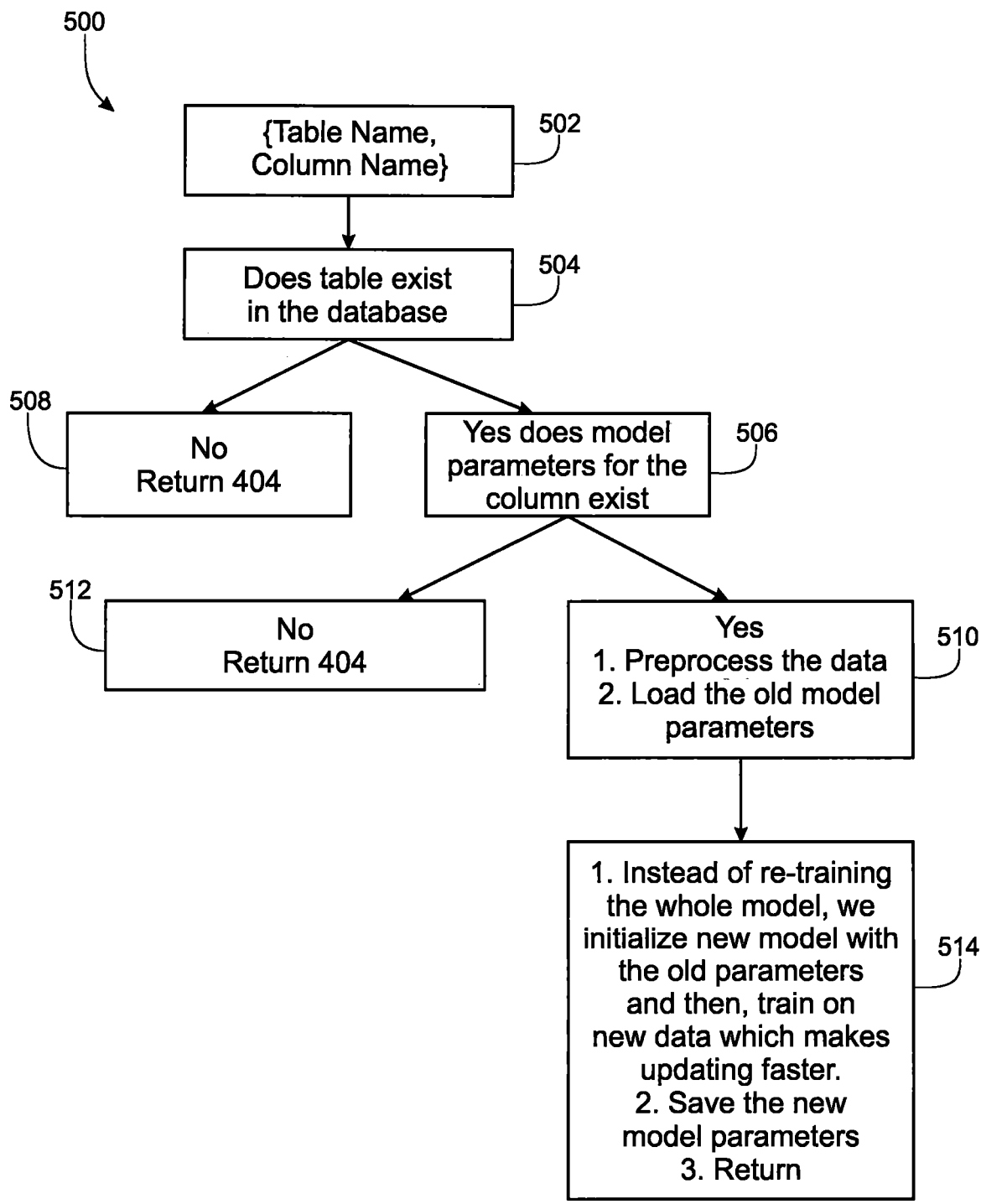

FIG. 5 illustrates a flowchart of the auto-update and training of the Machine Learning (ML) models, in accordance with an embodiment of the present subject matter.

FIG. 6 illustrates a perspective view of unstructured data, in accordance with an embodiment of the present subject matter.

FIG. 7 illustrates a perspective view of structured data, in accordance with an embodiment of the present subject matter.

Figure 8:
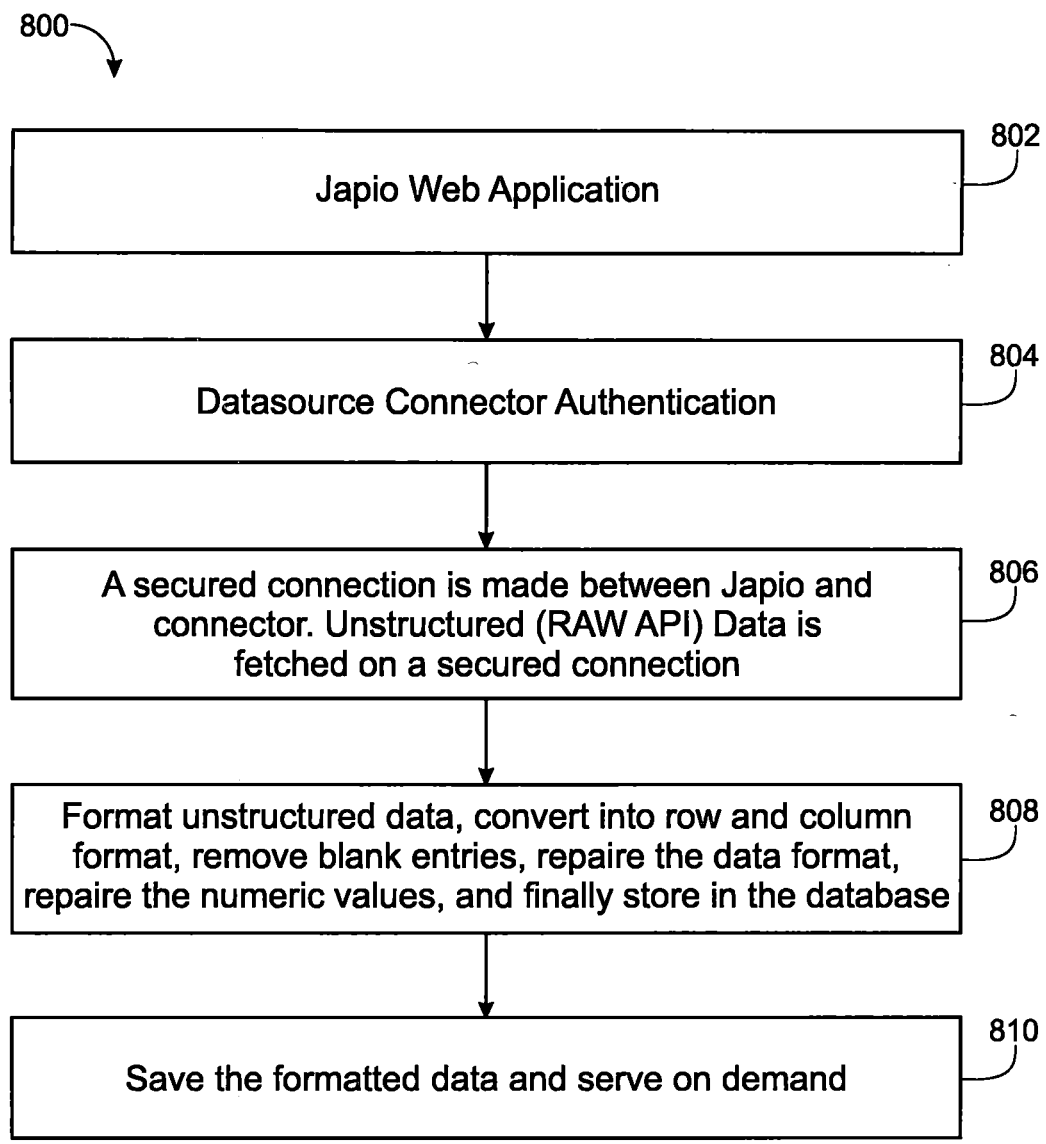

FIG. 8 illustrates a flowchart of the storing the formatted into the web application, in accordance with an embodiment of the present subject matter.

Figure 9:
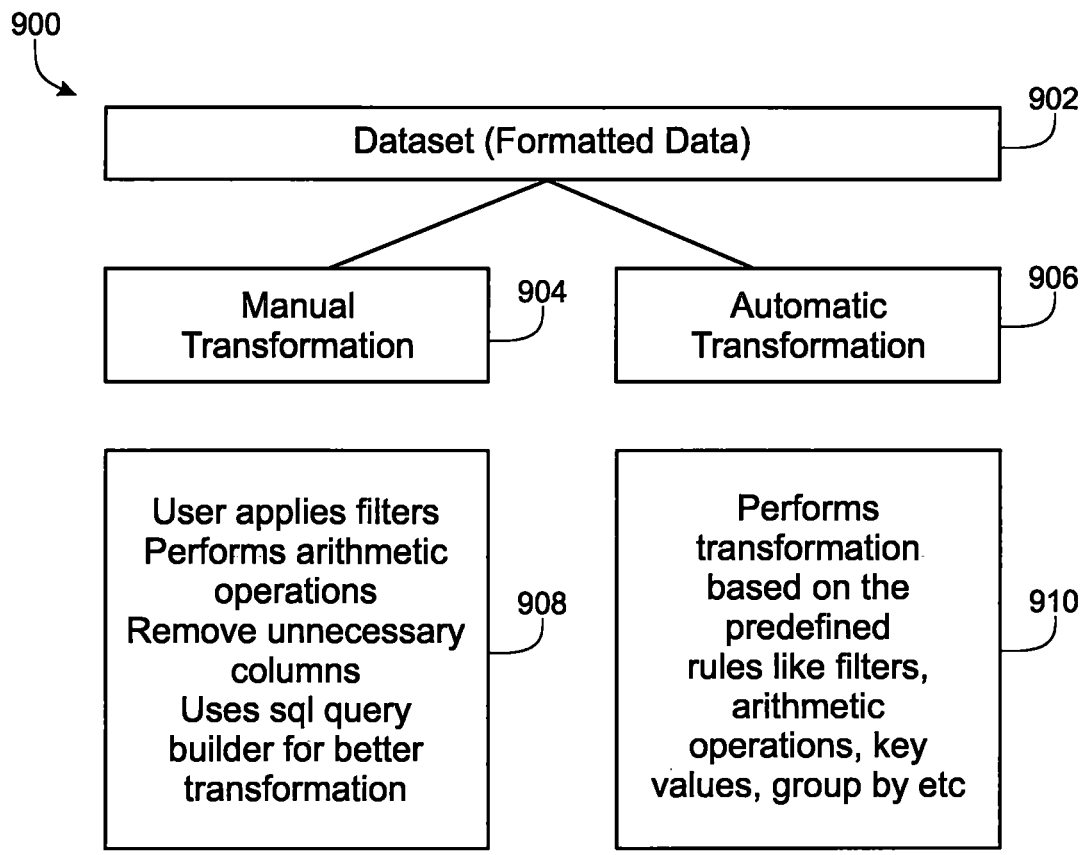

FIG. 9 illustrates a flowchart of the transformation methods, in accordance with an embodiment of the present subject matter.

Figure 10:
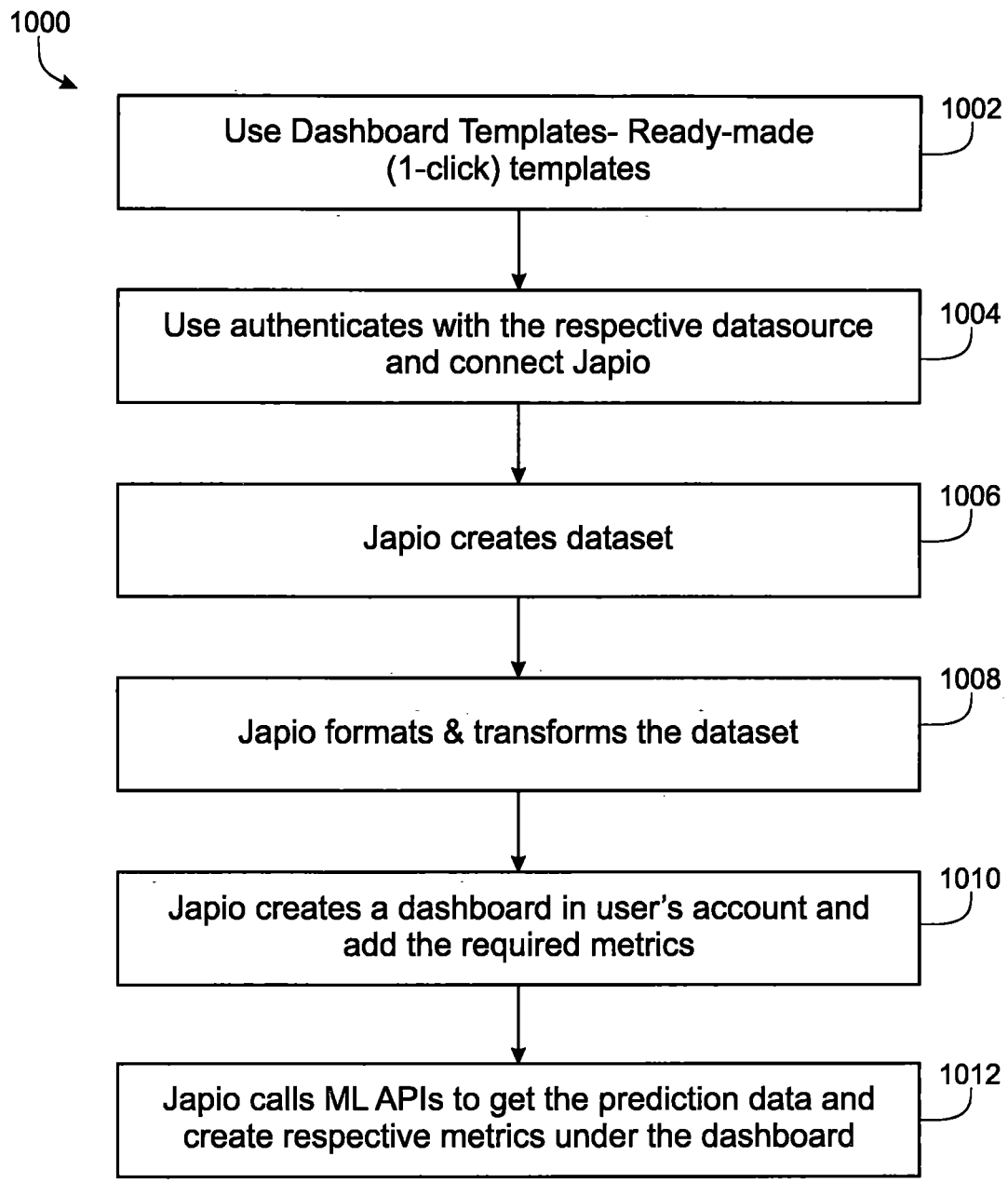

FIG. 10 illustrates a flowchart of the dashboard templates, in accordance with an embodiment of the present subject matter.

Figure 11:
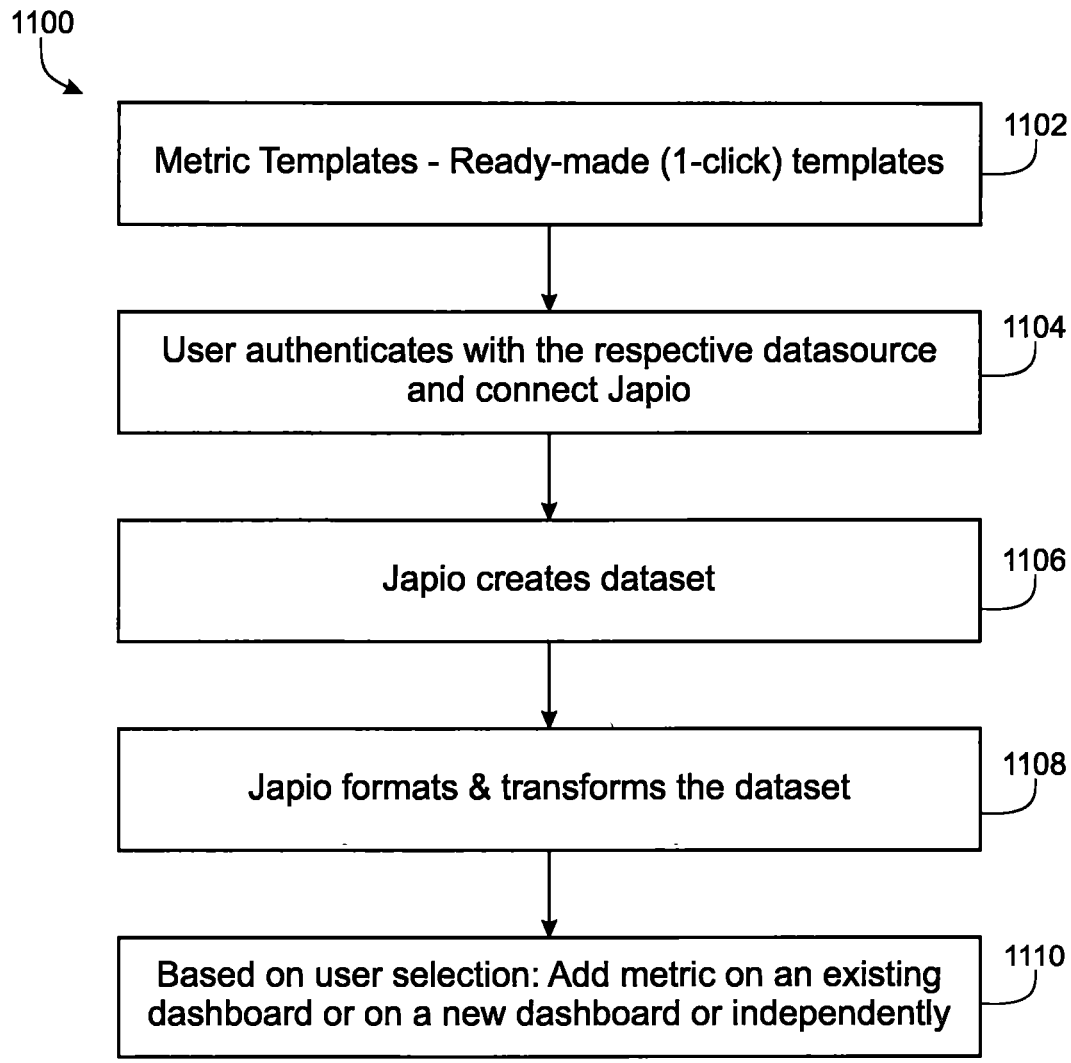

FIG. 11 illustrates a flowchart of the independent metric template, in accordance with an embodiment of the present subject matter.

DETAILED DESCRIPTION

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to or readily developed from known manners, means, techniques, and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

Figure 1:
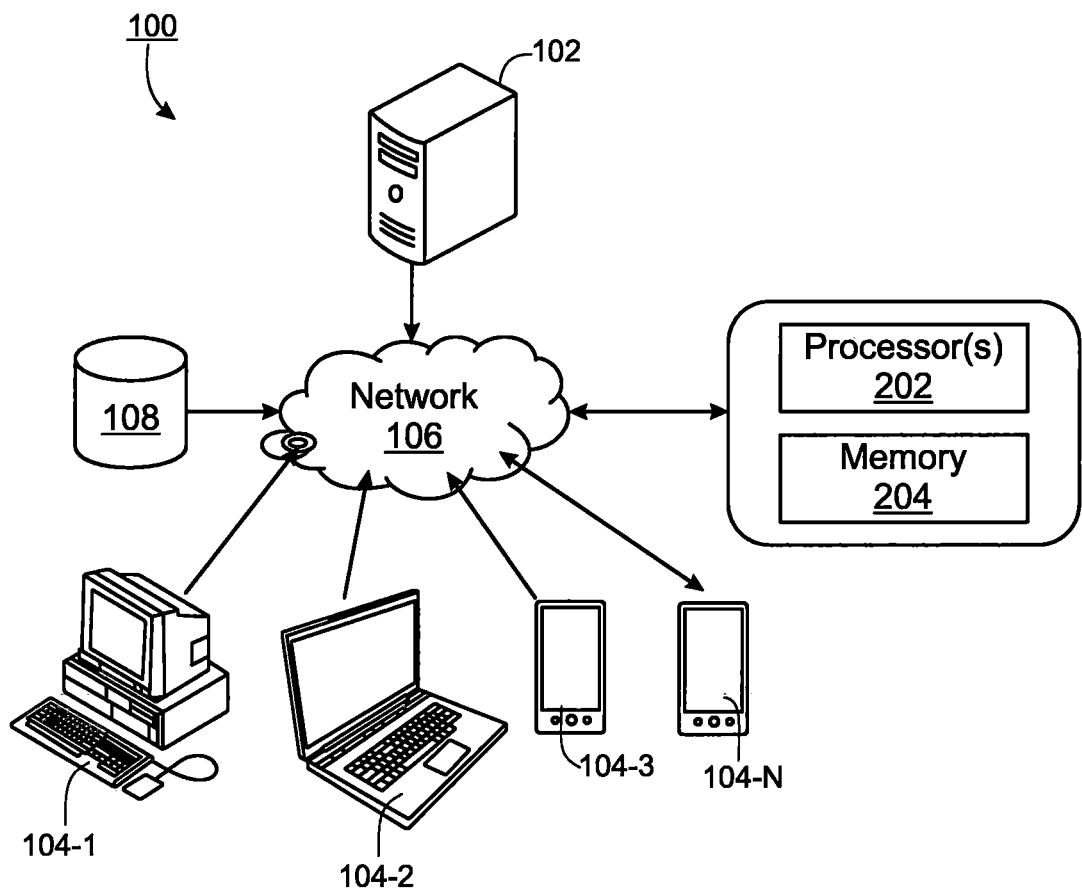

FIG. 1 illustrates a network implementation of the present computer-implemented system 100 for creating one or more forecast charts, in accordance with an embodiment of the present subject matter. Although the present subject matter is explained considering that the present system 100 is implemented on a server, it may be understood that the present system 100 may also be implemented in a variety of computing devices 104, such as a laptop computer, a desktop computer, a notebook, a workstation, a mainframe computer, a server, a network server, and the like. It will be understood that the present system 100 may be accessed by multiple users through one or more computing devices 104-1, 104-2 . . . 104-N, collectively referred to as computing device 104 hereinafter, or applications residing on the computer devices 104. Examples of the computing devices 104 may include but are not limited to, a portable computer, a personal digital assistant, a handheld device, and a workstation. The computing devices 104 are communicatively coupled to server 102, and database 108 through a network 106 and utilizes the various operating systems to perform the functions of the present system 102 such as Android®, IOS®, Windows®, etc.

In one implementation, the network 106 may be a wireless network, a wired network, or a combination thereof. The network 106 can be implemented as one of the different types of networks, such as an intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 100 includes one or more processors 202; and a memory 204. The processor 202 may be implemented as one or more microprocessors, microcomputers, microcontrollers, digital signal processors, central processing units, state machines, logic circuitries, and/or any devices that manipulate signals based on operational instructions.

The memory 204 is coupled to the one or more processors 202 and to store program instructions executable by the one or more processors 202. The memory 204 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The memory 204 may include various modules. The modules include routines, programs, objects, components, data structures, etc., which perform particular tasks or implement particular abstract data types.

The processors 202 are configured to connect a plurality of data sources to a website application. The website application is accessible through one or more computing devices 104. In an embodiment, the website application is commercialized as a Japio™ web application. The website application authenticates the plurality of data sources. The processors 202 are configured to retrieve, by the website application, unstructured data from the plurality of data sources. The processors 202 are configured to format unstructured data and convert the unstructured data into structured data by using an open standard file format and data interchange format. In an embodiment, the open standard file format and data interchange format is a JavaScript Object Notation (JSON) format. The website application stores the structured data in a table of database 108. In an embodiment, the table is a MySQL table. The table organizes the valid formatted data in a form of rows and columns and displays the valid formatted data in a structured format. The processors 202 are configured to transform, by the website application, the structured data into one or more forecast charts by performing a plurality of computations by using a plurality of transformation methods. In an embodiment, the transformation methods include a manual transformation and an automatic transformation. In an embodiment, the manual transformation is performed by a user by applying one or more filters and a plurality of arithmetic operations. In an embodiment, the automatic transformation is performed for the dashboard and the independent metric template. The structured data is used on one or more of a plurality of dashboard templates, and a plurality of independent metric templates, wherein at least one of a dashboard template is selected from the plurality of dashboard templates presented over a user interface of the computing device 104 by a user. The user authenticates the dashboard template to connect with the data sources.

The processors 202 are configured to train a plurality of Machine Learning (ML) models on the structured data of the dashboard templates. The processors 202 are configured to deploy the Machine Learning (ML)models on server 102. The server 102 is connected to an application programming interface (API). In an embodiment, the application programming interface (API) is a REST API (RESTful APT). The ML models utilize recursive multi-step forecasting and adjust a parameter of the recursive multi-step forecasting to fit the structured data. In an embodiment, recursive multi-step forecasting is a forecasting approach where the time-based observation input set is used to predict the next time step. Then the prediction along with the previous set is used to predict the next time step. For example, 5 temperature values recorded per unit time will predict the 6th temperature value in the next unit time, then the 6th predicted temperature value along with the previous 5 temperature values will be used to predict a 7th temperature value in the next unit time. The predicted set is a one-step model, in the recursive multi-step model this one-step model is used multiple times.

The Machine Learning (ML) models are used to provide prediction data based on the structured data. The processors 202 are configured to create a dashboard based on the dashboard template selected by the user. The dashboard includes one or more forecast charts. The API receives and returns the prediction data to the web application where one or more forecast charts are displayed based on the prediction data. In an embodiment, the processors 202 are configured to facilitate the user to create the dashboard with a plurality of metrics. In an embodiment, the user selects one or more metric templates from the list. The user authenticates to connect with the required data source (if not authenticated already). Further, the user selects the desired dashboard or creates a new dashboard, or adds independently. The metrics are created under the user's account. In an embodiment, the processors 202 are configured to facilitate a user to open the dashboard in the web application or a shared dashboard. Then, the web application calls the application programming interface (API) which internally calls the respective ML models.

According to an embodiment herein, the forecast charts are used to predict the data over a future period. The customers will be able to use a forecasting chart and add it to their desired dashboard. These forecast charts belong to a dashboard template and have respective ML (machine learning)models. In an embodiment, the present system creates ML models, trains them well on the dataset of the dashboard template, and finally deploys it on a server that is further linked to a REST API. In an embodiment, the present system provides a separate AWS EC2 instance for deploying the model and respective REST APIs. Japio™ web application calls the ML REST API which internally calls the respective model and receives & returns the prediction data to the web application where a chart is shown based on the prediction data.

As used herein, and unless the context dictates otherwise, the term "configured to" or "coupled to" is intended to include both direct coupling (in which two elements that are coupled to each other contact each other) and indirect coupling (in which at least one additional element is located between the two elements). Therefore, the terms "configured to", "configured with", "coupled to" and "coupled with" are used synonymously. Within the context of this document terms "configured to", "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

FIG. 2 illustrates a flowchart 20 of the present computer-implemented method for creating one or more forecast charts, in accordance with an embodiment of the present subject matter. The method includes step 201 of connecting a plurality of data sources to a website application. The website application authenticates the plurality of data sources. The method includes a step 203 of retrieving, by the website application, unstructured data from the plurality of data sources. The method includes a step 206 of formatting unstructured data and converting the unstructured data into structured data by using an open standard file format and data interchange format. In an embodiment, the open standard file format and data interchange format is a JavaScript Object Notation (JSON) format. The website application stores the structured data in a table of a database. In an embodiment, the table is a MySQL table. The table organizes the valid formatted data in a form of rows and columns and displays the valid formatted data in a structured format. The method includes a step 208 of transforming, by the website application, the structured data into one or more forecast charts by performing a plurality of computations by using a plurality of transformation methods. In an embodiment, the transformation methods include a manual transformation and an automatic transformation. In an embodiment, the manual transformation is performed by a user by applying one or more filters and a plurality of arithmetic operations. In an embodiment, the automatic transformation is performed for the dashboard and the independent metric template.

The structured data is used on one or more of a plurality of dashboard templates, and a plurality of independent metric templates. In an aspect, a dashboard template is selected from the plurality of dashboard templates presented over a user interface of the computing device by a user. The user authenticates the dashboard template to connect with the data sources. The method includes a step 210 of training a plurality of Machine Learning (ML) models on the structured data of the dashboard templates. The method includes a step 212 of deploying the Machine Learning (ML) models on a server. The server is connected to an application programming interface (API). In an embodiment, the application programming interface (API) is a REST API (RESTful API). The ML models utilize recursive multi-step forecasting and adjust a parameter of the recursive multi-step forecasting to fit the structured data. The Machine Learning (ML) models are used to provide prediction data based on the structured data. The method includes a step 214 of creating a dashboard based on the dashboard template selected by the user. The dashboard includes the one or more forecast charts. The API receives and returns the prediction data to the web application where the one or more forecast charts are displayed based on the prediction data.

In an embodiment, the processors are configured to facilitate the user to create the dashboard with a plurality of metrics. In an embodiment, the user selects one or more metric templates from the list. The user authenticates to connect with the required data source (if not authenticated already). Further, the user selects the desired dashboard or creates a new dashboard, or adds independently. The metrics are created under the user's account. In an embodiment, the processors are configured to facilitate a user to open the dashboard in the web application or a shared dashboard. Then, the web application calls the application programming interface (API) which internally calls the respective ML models.

FIG. 3 illustrates an operational flowchart 300 of the present computer-implemented method for creating one or more forecast charts by using ML models, in accordance with an embodiment of the present subject matter. In operation, at step 302, the user opens a dashboard in the Japio™ web application or the user opens a shared dashboard. At step 304, the ML REST API receives the request from the Japio™ web application and passes it to the respective machine learning model. At step 306, the ML model uses a recursive multi-step forecasting approach. In this approach, the ML model will predict data for the next set of y days which then will be used to predict data for the next set of y days. In the training phase, the model will predict and then, tune its parameters to fit the real data. ML model is trained the data on models such as linear regressor, SGD regressor, lasso, ElasticNet and then, take the best or average output. At step 308, ML API returns the prediction to the Japio™ web application and further a forecast chart is rendered based on the response returned by ML API. The user can filter the prediction by the number of days.

FIG. 4 illustrates a flowchart 400 of the Machine Learning (ML) models to provide prediction data based on the structured data, in accordance with an embodiment of the present subject matter. The website application stores the structured data in a table of a database. At step 402, the website application identifies various components such as the table name, days, and column name. The table organizes the valid formatted data in a form of rows and columns and displays the valid formatted data in a structured format. At step 404, the method determines whether a table exists in the database. At step 408, if the table does not exist in the database, the method stops further processing. At step 406, if the table exists in the database, the method determines whether parameters of the ML model for the column exist or not. At step 410, if the parameters of the ML model for the column exist, the method loads the parameters and predicts the output and return. At step 412, if the parameters of the ML model for the column do not exist, the method performs preprocessing the data. In step 414, the method uses a prophet model for preprocessing the data. The prophet model uses an additive regression model, and a piecewise linear or logistic growth curve trend. The prophet model automatically detects changes in trends by selecting changepoints from the data. Further, a yearly seasonal component is modeled using the Fourier series. Furthermore, a weekly seasonal component modeled using dummy variables. In step 416, the method selects the best parameters such as changepoint_priority_scale, seasonality_priority_scale, and others using cross-validation techniques. Then the Machine Learning (ML) models provided by the prophet library are trained with the parameters. The parameters of the Machine Learning (ML) models are saved. Lastly, the Machine Learning (ML) models predict the data and return.

FIG. 5 illustrates a flowchart 500 of the auto-update and training of the Machine Learning (ML) models, in accordance with an embodiment of the present subject matter. The website application stores the structured data in a table of a database. At step 502, the website application identifies various components such as the table name and column name. At step 504, the method determines whether a table exists in the database. At step 508, if the table does not exist in the database, the method stops further processing. At step 506, if the table exists in the database, the method determines whether parameters of the ML model for the column exist or not. At step 512, if the parameters of the ML model for the column do not exist, the method stops further processing. At step 510, if the parameters of the ML model for the column exists, the method preprocesses the data and load the parameters of the old ML model. At step 514, instead of re-training the whole ML model, the method initializes a new ML model with the old parameters and then train on new data which makes updating faster.

According to an embodiment herein, the user connects one or more data sources (connectors) in the Japio™ web application. Japio™ authenticates and fetches Data (RAW API Data) from the data source which is unstructured. A respective dataset is created and the raw API data is associated with the same. Raw data is processed and formatted in row and column form and saved into the database in JSON format. Currently, we are fetching unstructured data twice a day, formatting and saving it into the database.

FIG. 6 illustrates a perspective view 600 of unstructured data, in accordance with an embodiment of the present subject matter. In an embodiment, the unstructured data is in Jason format. To format it, the present system decodes it and iterates through each record to check if it's valid and non-empty data. FIG. 7 illustrates a perspective view 700 of structured data, in accordance with an embodiment of the present subject matter. The present system and method ignore the invalid data and only store the valid one in the MySQL table (the formatted or structured data).

FIG. 8 illustrates a flowchart 800 of the storing the formatted into the web application 802, in accordance with an embodiment of the present subject matter. At step 804, the method connects the data sources to the website application and the website application authenticates the data sources. At step 806, the method establishes a secure connection between the Japio™ web application and a connector and retrieves the unstructured data on a secured connection. At step 808, the method formats unstructured data and converts the unstructured data into structured data by using an open standard file format and data interchange format. Further, the method removes blank entries, repairs the data format, repair the numeric values, and then the website application stores the structured data in the database. At step 810, the method stores the formatted data and serves on demand.

FIG. 9 illustrates a flowchart 900 of the transformation methods, in accordance with an embodiment of the present subject matter. At step 902, the method receives the formatted data. The method transforms the structured data into one or more forecast charts by using a manual transformation 904 and an automatic transformation 906. At step 908, the user applying one or more filters and a plurality of arithmetic operations. Then unnecessary columns are removed and uses SQL query builder for better transformation. At step 910, the automatic transformation performs transform based on the predefined rules like filters, arithmetic operations, key values, and group.

In an embodiment, the dashboard templates are ready-made dashboards that allow users to minimize their work and add a readymade (predefined dashboard with a readymade template) dashboard and save their time. The user can see the list of dashboard templates and select the template, and authenticate to connect with the required data source. Further, a respective dashboard is created in the user's account which can be further shared. The dashboard shows prediction/forecasting charts. In an embodiment, the present system uses ML (Machine Learning) models to predict the data.

FIG. 10 illustrates a flowchart 1000 of the dashboard templates, in accordance with an embodiment of the present subject matter. At step 1302, the user uses dashboard templates-ready-made (1-click) templates. At step 1004, the user authenticates with the respective data source and connects the Japio™ web application. At step 1006, the Japior™ web application creates a dataset. At step 1008, the Japio™ web application formats and transforms the dataset. At step 1010, the Japio™ web application creates a dashboard in the user's account and adds the required metrics. At step 1012, the Japio™ web application calls ML APIs to get the prediction data and create respective metrics under the dashboard.

In an embodiment, the present invention provides 1-click metrics so that the users can create their dashboards with various meurics. These are readymade metrics, and the user will select the one and add it on the desired dashboard or independently from the dashboard. Further, the user selects one or multiple metric templates from the list. Furthermore, the user authenticates to connect with the required data source (if not authenticated already). Then the user selects the desired dashboard or creates a new dashboard or adds independently. The metrics are created under the user's account.

FIG. 11 illustrates a flowchart 1100 of the independent metric template, in accordance with an embodiment of the present subject matter. At step 1102, the user uses metric templates-ready-made (1-click) templates. At step 1104, the user authenticates with the respective data source and connects the Japio™ web application. At step 1106, the Japio™ web application creates a dataset. At step 1108, the Japio™ web application formats and transforms the dataset. At step 1110, the method adds metrics on an existing dashboard or a new dashboard or independently based on the user selection.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

What is claimed is:

1. A computer-implemented system for creating one or more forecast charts, comprising:
    a computing device, wherein the computing device comprises:
        a processor; and
        a memory communicatively coupled to the processor, wherein the memory stores instructions executed by the processor, wherein the processor is configured to:
            connect a plurality of data sources to a website application, wherein the website application authenticates the plurality of data sources;
            retrieve, by the website application, unstructured data from the plurality of data sources;
            format unstructured data and convert the unstructured data into structured data by using an open standard file format and data interchange format, wherein the website application stores the structured data in a table of a database;
            transform, by the website application, the structured data into one or more forecast charts by performing a plurality of computations by using a plurality of transformation methods, wherein the structured data is used on one or more of a plurality of dashboard templates, and a plurality of independent metric templates, wherein at least one of a dashboard template is selected from the plurality of dashboard templates presented over a user interface of the computing device by a user, wherein the user authenticates the dashboard template to connect with the data sources, wherein the user selects a desired dashboard, creates a new dashboard, and adds the dashboard independently, wherein the processor is configured to facilitate the user to open the dashboard in one or more of the web application, and a shared dashboard, wherein the website application retrieves the unstructured data from the data sources over a secure communication, wherein the unstructured data is formatted by removal of blank entries, repairing of the data format, and repairing of the numeric values;
            train a plurality of Machine Learning (ML) models on the structured data of the dashboard templates;
            deploy the Machine Learning (ML) models on a server, wherein the server is connected to an application programming interface (API), wherein the ML models utilize a recursive multi-step forecasting and adjust a parameter of the recursive multi-step forecasting to fit the structured data, wherein the Machine Learning (ML) models are used to provide a prediction data based on the structured data; and
            create a dashboard based on the dashboard template selected by the user, wherein the dashboard includes the one or more forecast charts, wherein the API receives and returns the prediction data to the web application where the one or more forecast charts are displayed based on the prediction data, wherein the forecast charts predict the data over a future period, wherein the users use the forecasting chart and add the forecasting chart to the desired dashboard, wherein the forecast charts belong to the dashboard template and include the respective ML models.

2. The computer-implemented system or claim 1, wherein the processor is configured to facilitate the user to create the dashboard with a plurality of metrics.

3. The computer-implemented system of claim 1, wherein the processor is configured to facilitate a user to open the dashboard in the web application, wherein the web application calls the application programming interface (API) which internally calls the respective ML models.

4. The computer-implemented system of claim 1, wherein the open standard file format and data interchange format is a JavaScript Object Notation (JSON) format.

5. The computer-implemented system of claim 1, wherein the table is a MySQL table, wherein the table organizes the valid formatted data in a form of rows and columns and displays the valid formatted data in a structured format.

6. The computer-implemented system of claim 1, wherein the plurality of transformation methods comprising a manual transformation and an automatic transformation.

7. The computer-implemented system of claim 6, wherein the manual transformation is performed by a user by applying one or more filters and a plurality of arithmetic operations.

8. The computer-implemented system of claim 6, wherein the automatic transformation is performed for the dashboard and the independent metric template.

9. The computer-implemented system of claim 1, wherein the application programming interface (API) is a REST API (RESTful API).

10. A computer-implemented method for creating one or more forecast charts, comprising:
  connecting a plurality of data sources to a website application, wherein the website application authenticates the plurality of data sources;
  retrieving, by the website application, unstructured data from the plurality of data sources;
  formatting unstructured data and converting the unstructured data into structured data by using an open standard file format and data interchange format, wherein the website application stores the structured data in a table of a database;
  transforming, by the website application, the structured data into one or more forecast charts by performing a plurality of computations, by using a plurality of transformation methods, wherein the structured data is used on one or more of a plurality of dashboard templates, and a plurality of independent metric templates, wherein at least one of a dashboard template is selected from the plurality of dashboard templates presented over a user interface of the computing device by a user, wherein the user authenticates the dashboard template to connect with the data sources, wherein the user selects a desired dashboard, creates a new dashboard, and adds the dashboard independently, wherein the processor is configured to facilitate the user to open the dashboard in one or more of the web application, and a shared dashboard, wherein the website application retrieves the unstructured data from the data sources over a secure communication, wherein the unstructured data is formatted by removal of blank entries, repairing of the data format, and repairing of the numeric values;
  training a plurality of Machine Learning (ML) models on the structured data of the dashboard templates;
  deploying the Machine Learning (ML) models on a server, wherein the server is connected to an application programming interface (API), wherein the ML models utilize a recursive multi-step forecasting and adjust a parameter of the recursive multi-step forecasting to fit the structured data, wherein the Machine Learning (ML) models are used to provide a prediction data based on the structured data; and
  creating a dashboard based on the dashboard template selected by the user, wherein the dashboard includes the one or more forecast charts, wherein the API receives and returns the prediction data to the web application where the one or more forecast charts are displayed based on the prediction data, wherein the forecast charts predict the data over a future period, wherein the users use the forecasting chart and add the forecasting chart to the desired dashboard, wherein the forecast charts belong to the dashboard template and include the respective ML models.

11. The computer-implemented method of claim 10, wherein the processor is configured to facilitate the user to create the dashboard with a plurality of metrics.

12. The computer-implemented method of claim 10, wherein the processor is configured to facilitate a user to open the dashboard in the web application, wherein the web application calls the application programming interface (API) which internally calls the respective ML models.

13. The computer-implemented method of claim 10, wherein the open standard file format and data interchange format is a JavaScript Object Notation (JSON) format.

14. The computer-implemented method of claim 10, wherein the table is a MySQL table, wherein the table organizes the valid formatted data in a form of rows and columns and displays the valid formatted data in a structured format.

15. The computer-implemented method of claim 10, wherein the plurality of transformation methods comprising a manual transformation and an automatic transformation.

16. The computer-implemented method of claim 15, wherein the manual transformation is performed by a user by applying one or more filters and a plurality of arithmetic operations.

17. The computer-implemented method of claim 15, wherein the automatic transformation is performed for the dashboard and the independent, metric template.

18. The computer-implemented method of claim 10, wherein the application programming interface (API) is a REST API (RESTful API).

* * * * *